United States Patent [19]

Phillips

[11] Patent Number: 5,165,762
[45] Date of Patent: Nov. 24, 1992

[54] BICYCLE WHEEL QUICK-RELEASE APPARATUS

[76] Inventor: Harley V. Phillips, 629 N. Main St., Hutchinson, Kans. 67501

[21] Appl. No.: 760,571

[22] Filed: Sep. 16, 1991

[51] Int. Cl.⁵ .............................................. B60B 27/06
[52] U.S. Cl. ................... 301/110.5; 301/111; 403/146; 403/372; 411/434
[58] Field of Search ............... 301/105 R, 105 B, 111, 301/114, 124 R, 125; 411/432, 433, 434, 266; 403/146, 372; 70/225, 229, 233

[56] References Cited

U.S. PATENT DOCUMENTS

| | | | |
|---|---|---|---|
| 4,033,627 | 7/1977 | Morroni | 301/111 |
| 4,079,958 | 3/1978 | Segawa | 280/279 |
| 4,400,038 | 8/1983 | Hosokawa | 301/111 |
| 4,763,957 | 8/1988 | Poehlmann et al. | 301/105 B |
| 4,770,011 | 9/1988 | Constant | 301/111 X |
| 4,789,206 | 12/1988 | Ozaki | 301/111 |
| 4,805,941 | 2/1989 | Downing et al. | 280/279 |
| 4,906,053 | 3/1990 | Kawai | 301/105 B |
| 4,964,287 | 10/1990 | Gaul | 70/233 |
| 4,971,397 | 11/1990 | Nichols et al. | 301/105 B |
| 5,005,390 | 4/1991 | Giannini et al. | 70/225 |

FOREIGN PATENT DOCUMENTS

| | | | |
|---|---|---|---|
| 408298 | 10/1944 | Italy | 301/111 |
| 461929 | 2/1951 | Italy | 301/125 |
| 1307112 | 4/1987 | U.S.S.R. | 411/434 |
| 658726 | 10/1951 | United Kingdom | 301/125 |

Primary Examiner—Russell D. Stormer
Attorney, Agent, or Firm—John R. Flanagan

[57] ABSTRACT

A quick-release apparatus having improved features is used with a hub and axle assembly for attaching a bicycle wheel to the frame of the bicycle. The assembly includes a hollow hub for mounting a bicycle wheel and a hollow axle extending through the hub and rotatably mounting the hub. The axle has a pair of opposite ends which extend from opposite ends of the hub and are interfitted with lower tips of a pair of fork tines of the bicycle frame. A first improved feature is a protuberance on the body of a cam lever assembly serving as a locator which positively aligns the cam lever to pivotally move the cam lever to the proper engaged position and prevents the cam lever from being used as a wrench to rotate the drawbar shaft. The second improved feature is an adjustable nut assembly which can be easily preset to have the correct number of compression washers to impose the desired level of tensioning force on the drawbar shaft when the cam lever arm is moved to its engaged position. The third improved feature is a bifurcated structure on the cam lever serving as a locator of the proper position for the cam lever and that will require it to be placed on only one predetermined side of the bicycle.

19 Claims, 2 Drawing Sheets

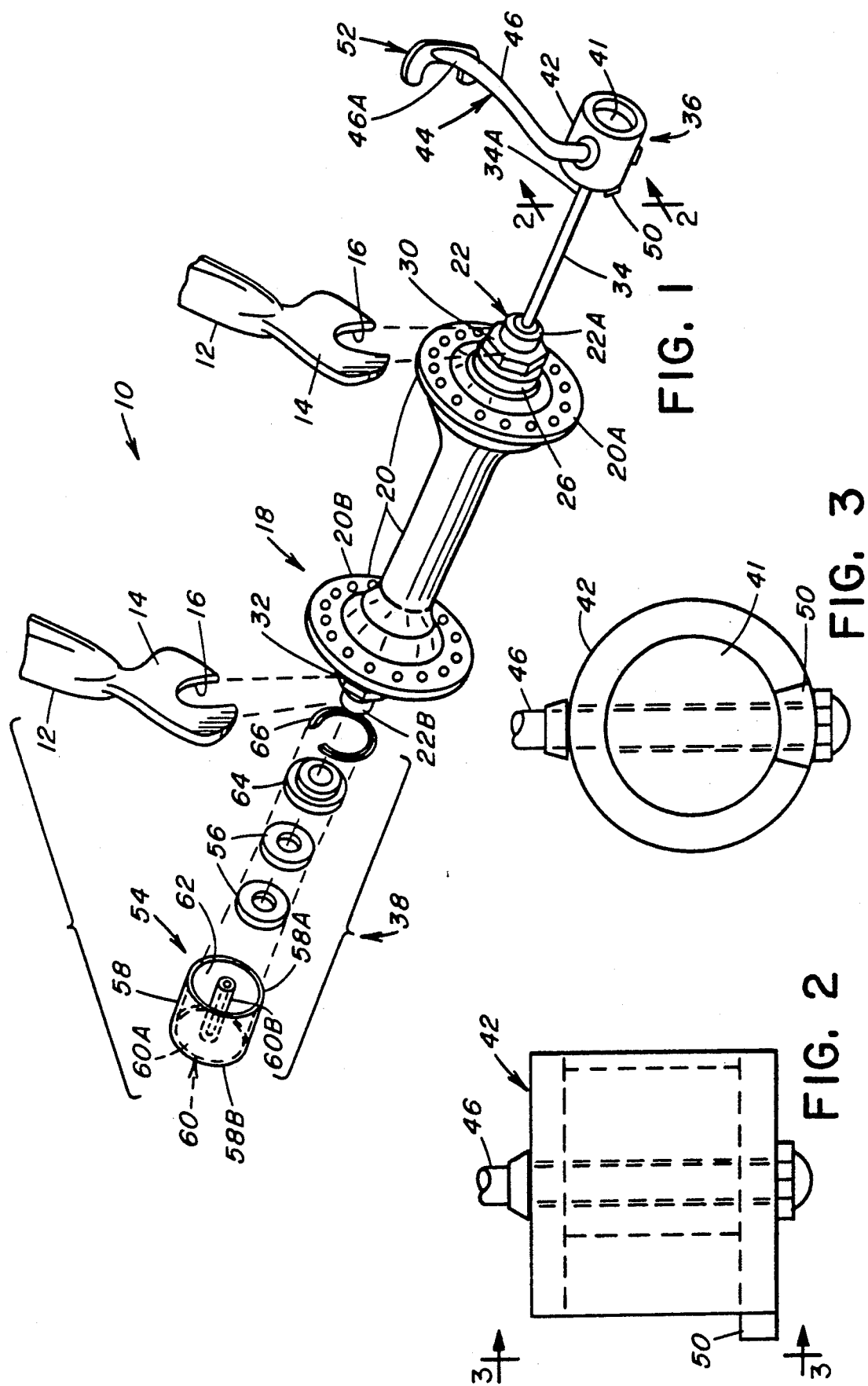

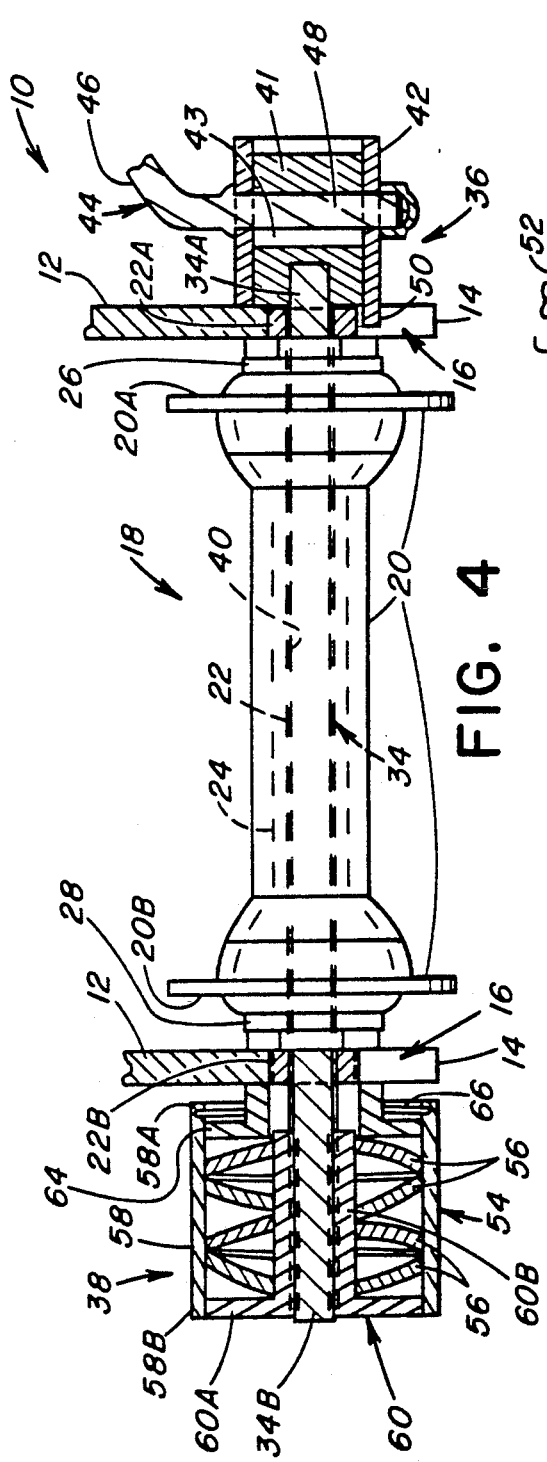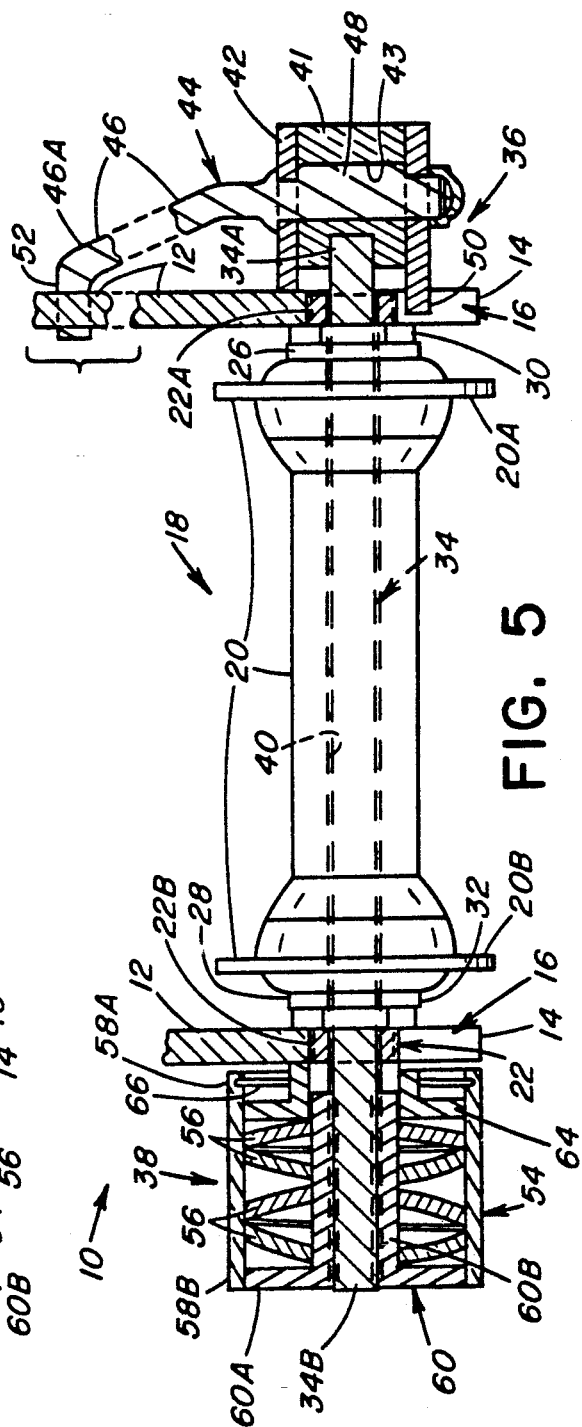

BICYCLE WHEEL QUICK-RELEASE APPARATUS

BACKGROUND OF THE INVENTION

1. Field of the Invention

The present invention generally relates to quick-release mechanisms for attaching and removing a bicycle wheel to and from a bicycle frame without the use of tools and, more particularly, is concerned with a quick-release apparatus with improved features that promote proper attachment of the bicycle wheel to the frame.

2. Description of the Prior Art

Heretofore, bicycles have employed various quick-release mechanisms designed to enable wheels to be removed quickly and easily in order to repair the wheels, to more readily transport the bicycle by a vehicle, and to prevent theft of the wheels. Different quick-release mechanisms known in the prior patent art are exemplified by the ones disclosed in U.S. Pat. No. 4,033,627 to Morroni, U.S. Pat. No. 4,079,958 to Segawa, U.S. Pat. No. 4,400,038 to Hosokawa, U.S. Pat. No. 4,763,957 to Poehlmann et al, U.S. Pat. No. 4,789,206 to Ozaki, and U.S. Pat. No. 4,805,941 to Downing et al, U.S. Pat. No. 4,906,053 to Kawai, U.S. Pat. No. 4,964,287 to Gaul, U.S. Pat. No. 4,971,397 to Nichols et al, and U.S. Pat. No. 5,005,390 to Giannini et al.

One design of a quick-release mechanism, widely used on bicycles, especially in conjunction with front wheels, and disclosed in many of the patents cited above, basically employs an elongated skewer or drawbar shaft, a cam lever assembly, and a cap nut. The bicycle frame has front and rear forks for mounting the bicycle wheels. The front fork for mounting the front wheel includes a pair of blades or tines having mounting slots defined at their lower tips which open in a downward direction. The front wheel includes a hub and axle assembly having a wheel hub and a hollow axle for rotatably mounting the wheel hub across the space between the front fork tines. The axle has opposite ends which extend beyond opposite ends of the wheel hub and fit within the mounting slots at the lower tips of the fork tines.

The drawbar shaft of the quick-release mechanism is removably mounted through the hollow axle of the wheel axle assembly and extends from opposite ends of the axle. The cam lever assembly of the quick-release mechanism is mounted at one end of the drawbar shaft extending from one end of the axle. The cam lever assembly includes a body slidably mounted for axial movement on the one end of the shaft and a cam lever pivotally mounted to the body for producing axial movement of the body toward and away from the cap nut on the other end of the shaft. The cam lever has an outer lever arm and an inner cam element rigidly attached to the outer lever arm and engaged with the body. Pivotal movement of the outer lever arm rotates the inner cam element relative to the body producing axial movement of the body.

The cap nut of the quick-release mechanism is threaded on the other end of the drawbar shaft extending from the other end of the axle. With the cap nut threadably positioned at a proper location from the axle assembly on the other end of the drawbar shaft, the wheel can be properly attached between the tips of the front forks of the bicycle frame by pivoting the lever arm of the cam lever assembly from a disengaged position to an engaged position. As the lever arm pivotally moves from the disengaged position toward the engaged position, the cam element rotates causing the body to axially move toward the cap nut. Such movement ceases when both the cam lever body and the cap nut engage the outer sides of the respective adjacent tips of the front forks. Then, completion of pivotal movement of the lever arm to the engaged position imposes a force on the drawbar shaft that places it under tension, causing the cam lever body and cap nut to clamp the tips of the front forks against the opposite ends of the axle and thereby secure the bicycle wheel to the frame.

There is a correct procedure or order of steps to follow for ensuring proper attachment of the bicycle wheel to the frame. First, the lever arm is initially placed at the disengaged position. Next, the cap nut is rotated relative to the shaft to place it at a desired location along the shaft which is the desired distance from the one end of axle that will result in the desired tension being applied to the drawbar shaft when the lever arm reaches its engaged position. The lever arm is then pivoted from the disengaged position to the engaged position.

Bicycles employing the above-described quick-release mechanism are used by a wide variety of persons. Most users are very interested in proper use and care of their bicycles and thus will have the interest and take the time to learn how to properly operate the quick-release mechanism. However, some users, unfortunately too many, are careless in this regard and will fail to learn nor to follow the above-described correct procedure for properly attaching the wheel.

Oftentimes, these latter users will first pivot the lever arm from the disengaged to engaged position and then threadably tighten the cap nut toward the engaged lever arm in an attempt to apply enough tension to clamp the axle between the fork tips. By following this incorrect procedure, insufficient tension will be imparted in the drawbar shaft to securely clamp the wheel axle between the frame fork tips.

At other instances, these latter users will not threadably adjust the cap nut relative to the drawbar shaft at all, but instead will rotate the lever arm while at its disengaged position to cause rotation of the drawbar shaft in a manner that will tighten the cap screw. Thereafter, the lever arm is pivoted from the disengaged position to the engaged position to apply tension to the shaft. By following this incorrect procedure, the drawbar shaft typically becomes either over-tensioned or under-tensioned. Over-tensioning of the drawbar shaft leads to its fracture and the failure of the quick-release mechanism. Under-tensioning of the drawbar shaft leads to inadequate clamping of the frame fork tips against the wheel axle. Both over-tensioning and under-tensioning of the shaft in such manner eventually result in unexpected detachment of the wheel from the bicycle frame.

At the present time no satisfactory design has been proposed that will solve the problem of how to ensure that all users will learn and follow the correct order of steps in operating the quick-release mechanism to properly attach the wheel to the bicycle frame. Consequently, a need urgently exists for an improved design of the above-described quick-release mechanism. The improved design will be one that promote practices which are reasonably expected to lead to proper mounting of the bicycle wheel to the frame.

SUMMARY OF THE INVENTION

The present invention provides an improved bicycle wheel quick-release apparatus designed to satisfy these needs and overcome these problems. The quick-release apparatus of the present invention incorporates three improved features which promote and enable practices that will result in proper attachment of the bicycle wheel to the frame. The improved features of the quick-release apparatus perform separate and distinct functions that are independent of one another and so can be employed either individually or in different combinations together, as desired. Also, the improved features can be retrofitted either individually or in the different combinations, as desired, to existing quick-release mechanisms in the field.

The improved features of the quick-release apparatus of the present invention are employed with a conventional hub and axle assembly in properly attaching the bicycle wheel to the frame of the bicycle. The assembly includes a hollow hub for mounting a bicycle wheel and a hollow axle extending through the hub and rotatably mounting the hub. The axle has a pair of opposite ends which extend from opposite ends of the hub and are interfitted with slots defined in the lower tips of a pair of fork tines of the bicycle frame.

The quick-release apparatus of the present invention incorporating the improved features includes a drawbar shaft removably mounted through the hollow axle and having opposite ends extending from opposite ends of the axle, a cam lever assembly mounted at one end of the drawbar shaft extending from one end of the axle, and an adjustable nut assembly threaded on the other end of the drawbar shaft extending from the other end of the axle. The cam lever assembly includes a body slidably mounted for axial movement on the one end of the shaft and a cam lever pivotally mounted to the body for producing axial movement of the body toward and away from the axle end.

Manual pivoting of the cam lever from a disengaged position to an engaged position relative to the body produces axial movement of the body toward the adjustable nut assembly on the other end of the shaft. The adjustable nut assembly and the body of the cam lever assembly engage the lower tips of the fork tines located on the opposite ends of the axle and impose a force on the drawbar shaft that places it under tension, causing the cam lever body and adjustable nut assembly to clamp the tips of the front forks against the opposite ends of the axle and thereby secure the bicycle wheel to the frame.

A first feature of the quick-release apparatus is a position-locating element attached to the body of the cam lever assembly and being configured to interfit at only one position with the tine tip of the adjacent one of the fork tines. More particularly, the position-locating element is a protuberance fixed on and projecting from a side of the body of the cam lever assembly facing toward an unoccupied portion of a slot in the lower tip of the one fork tine. Before the start of pivoting of the cam lever from its disengaged to engaged position, the locating protuberance is aligned and inserted within the slot in the one fork tine tip. The inserted locating protuberance will prevent the cam lever from being used as a wrench for rotating the drawbar shaft to threadably tighten the adjustable nut assembly on opposite end of the shaft.

A second feature of the quick-release apparatus is a position-locating member attached on the cam lever and being mateable at only one position with the adjacent fork tine. More particularly, the position-locating member is a bifurcated structure fixed on and extending transversely from an outer end of the cam lever. The cam lever must be aligned with the adjacent fork tine in order for the bifurcated structure to mate with it when the cam lever is pivoted to the proper engaged position.

A third feature of the quick-release apparatus is the construction of the adjustable nut assembly. The adjustable nut assembly includes a housing threaded onto the other end of the drawbar shaft opposite the one end mounting the cam lever assembly and a selected number of resiliently flexible compression elements disposed in the housing for presetting the desired amount of tension that can be imposed on the drawbar shaft when the cam lever is moved from its disengaged to engaged position.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is an exploded perspective iew of an improved bicycle wheel quick-release apparatus of the present invention in conjunction with a bicycle wheel hub and axle assembly.

FIG. 2 is an enlarged side elevational view of a cam lever body of the quick-release apparatus of the present invention taken along line 2—2 of FIG. 1.

FIG. 3 is a front elevational view of the cam lever body taken along line 3—3 of FIG. 2.

FIG. 4 is an assembled, partly sectioned, longitudinal view of the quick-release apparatus of the present invention showing the relative positions of the components of the apparatus after an adjustable nut assembly of the apparatus has been rotated and thereby axially moved to the desired location on a drawbar shaft of the apparatus but before a lever arm of the app: ratus have been pivoted from its disengaged to engaged position.

FIG. 5 is a view similar to that of FIG. 4 but showing the relative positions of the components of the apparatus after the lever arm of the apparatus has been pivoted from its disengaged to engaged position.

DETAILED DESCRIPTION OF THE PREFERRED EMBODIMENT

Bicycle Wheel Hub and Axle Assembly

Referring to the drawings, and particularly to FIG. 1, there is illustrated an improved quick-release apparatus of the present invention, generally designated 10, which can be used to attach the front wheel of a bicycle to the bicycle frame, although the apparatus 10 can be employed with the back wheel of the bicycle also.

As conventionally constructed, the frame of the bicycle typically includes a front fork having a pair of laterally-spaced blades or tines 12 with lower tips 14 for mounting the front wheel to the bicycle. The tines 12 have respective mounting slots 16 defined at their lower tips 14 which open in a downward direction.

The bicycle front wheel includes a hub and axle assembly 18 for mounting the front wheel to the bicycle frame. The hub and axle assembly 18 has a hollow wheel hub 20 for supporting the spokes, rim and tire (none of which are shown) of the wheel, and a hollow axle 22 which extends through an axial bore 24 in the hub 20. The axle 22 is greater in length than the hub 20 and thus has opposite ends 22A, 22B which extend from the opposite ends 20A, 20B of the hub 20.

A pair of bearing assemblies 26, 28 (only the outer ends of which are illustrated) are stationarily attached to and supported on the axle 22 at the interior of the opposite ends 20A, 20B of the hub 20. The bearing assemblies 26, 28 rotatably mount the hub 20 on the axle 22 extending across the space between the frame fork tines 12. The bearing assemblies 26, 28 are maintained in their desired stationary axial positions on the axle 22 by a pair of lock nuts 30, 32 threaded on the respective opposite ends 22A, 22B of the axle 22 adjacent to and in engagement with the outer ends of the bearing assemblies 26, 28. The opposite ends 22A, 22B of the axle 22 are received and fitted through the mounting slots 16 in the lower tips 14 of the frame fork tines 12 at locations adjacent to the outer sides of the lock nuts 30, 32.

The components of the bicycle wheel hub and axle assembly 18 which have been described above are well-known to one of ordinary skill in the art. These components need not be disclosed in any greater detail in order to understand the construction and operation of the quick-release apparatus 10 of the present invention.

Quick-Release Apparatus of the Invention

Referring to FIGS. 1, 4 and 5, there is illustrated the quick-release apparatus 10 of the present invention which incorporates the three improved features that promote proper attachment of the bicycle wheel to the frame. The quick-release apparatus 10 is employed with the above-described hub and axle assembly 18 for attaching the bicycle wheel to the frame of the bicycle.

The quick-release apparatus 10 basically includes an elongated skewer or drawbar shaft 34, a cam lever assembly 36, and an adjustable nut assembly 38. The drawbar shaft 34 is removably mounted through an elongated passage 40 of the hollow axle 22. The drawbar shaft 34 is greater in length than the axle 22 and so has opposite ends 34A, 34B respectively extending from the opposite ends 22A, 22B of the axle 22. The cam lever assembly 36 is mounted to the one end 34A of the drawbar shaft 34. The adjustable nut assembly 38 is threaded on the other end 34B of the drawbar shaft 34.

Referring also to FIGS. 2 and 3 in addition to FIGS. 1, 4 and 5, the cam lever assembly 36 includes a cam follower 41 attached on the one end 34A of the drawbar shaft 34, a hollow cylindrical body 42 mounted over the cam follower 41 for slidable axial movement relative to the cam follower 41 and the one end 34A of the drawbar shaft 34, and a cam lever 44 pivotally mounted to the body 42 for producing axial movement of the body 42 relative to the cam follower 41 and toward and away from the one axle end 22A. The cam lever 44 has an outer lever arm 46 and an inner cam element 48 rigidly attached to the outer lever arm 46 and rotatably mounted to the cylindrical body 42 and extending through a bore 43 in the cam follower 41.

With the adjustable nut assembly 38 threadably positioned on the other end 34B of the drawbar shaft 34 at a proper location relative to the other axle end 22B, the wheel can be properly attached between the tips 14 of the fork tines 12 of the bicycle frame by pivoting the lever arm 46 of the cam lever assembly 36 from a disengaged position seen in FIG. 4 to an engaged position seen in FIG. 5. As the outer lever arm 46 is pivotally moved from the disengaged position toward the engaged position, the inner cam element 48 rotates causing the cam lever body 42 to axially move relative to the cam follower 41 and drawbar shaft 34 toward the one axle end 22A and the adjustable nut assembly 38 on the other end 34B of the drawbar shaft 34. Such movement ceases when both the cam lever body 42 and the adjustable nut assembly 38 engage the outer sides of the respective adjacent tips 14 of the fork tines 12. Thereafter, completion of pivotal movement of the outer lever arm 46 to the engaged position imposes a force on the drawbar shaft 34 that places it under tension, causing the cam lever body 42 and the adjustable nut assembly 38 to clamp the tips 14 of the fork tines 12 against the opposite ends 22A, 22B of the axle 22 of the hub and axle assembly 18 and thereby secure the bicycle wheel to the frame.

Referring to FIGS. 1-3, the first improved feature of the quick-release apparatus 10 is a single position-locating element 50 attached to the body 42 of the cam lever assembly 36 and being configured to interfit at only one position with the lower tip 14 of the adjacent one of the fork tines 12. Preferably, the position-locating element 50 is in the form of a single protuberance, or tooth, 50 being of approximately the same width as the axle 22. The protuberance is fixed on and projects from an inner side the cam lever body 42 of the cam lever assembly 36. As seen in FIGS. 4 and 5, the protuberance 50 thus faces toward the lower tip 14 of the adjacent fork tine 12.

Before the start of pivoting of the cam lever arm 46 from its disengaged position to proper engaged position, the single position-locating protuberance 50 is aligned and inserted within an unoccupied portion of the slot 16 in the adjacent fork tine tip 14 which portion is located below the one end 22A of the axle 22. The position-locating protuberance 50 is thereby interfitted with the lower tip 14 of the adjacent fork tine 12 so as to prevent rotation of the cam lever arm 46 and body 42. This first improved feature thus prevents the cam lever arm 46 from being used as a wrench for rotating the drawbar shaft 34 to threadably tighten the adjustable nut assembly 38 on opposite end of the shaft 34.

Referring to FIGS. 1, 4 and 5, the second improved feature of the quick-release apparatus 10 is a single position-locating member 52 attached to the cam lever arm 46 and being mateable at only one position with the adjacent fork tine 12. The position-locating member 52 preferably is in the form of a bifurcated structure 52 fixed on and extending in transverse relation from an outer end 46A of the lever arm 46. The bifurcated structure 52 has a generally U-shaped configuration adapting it to mate with and at least partially encompass the adjacent fork tine 12, at a side thereof facing toward the cam lever assembly 36, when the lever arm is moved from the disengaged position of FIG. 4 to the engaged position of FIG. 5. Thus, the cam lever arm 46 must be aligned with the adjacent fork tine 12 in order for the outer bifurcated structure 52 to mate with it when the lever arm 46 is pivoted to the proper engaged position.

Referring again to FIGS. 1, 4 and 5, the third improved feature of the quick-release apparatus 10 is the adjustable nut assembly 38. The adjustable nut assembly 38 includes a housing 54 threaded onto the other end 34B of the drawbar shaft 34, and a preselected number of resiliently flexible compression elements 56 captured in the housing 54 for presetting the maximum amount of tension that can be imposed on the drawbar shaft when the cam lever 44 is moved from the disengaged position of FIG. 4 to the engaged position of FIG. 5. More particularly, the housing 54 includes a hollow outer sleeve 58 open at an inner end 58A, and a threaded outer nut 60 having an outer portion 60A fitted within and attached to an outer end 58B of the hollow sleeve 58. The outer nut 60 also has an inner central portion 60B fixed to and projecting axially from the outer portion 60A thereof and being internally threaded for threading onto an externally threaded portion of the other end 34B of the drawbar shaft 34. The inner central portion 60B is smaller in diameter than the outer portion 60A of the threaded outer nut 60 so as to provide an annular space 62 within the outer sleeve 58 about the inner portion 60B of the threaded outer nut 60.

Further, the adjustable nut assembly 38 includes a non-threaded inner washer 64 fitted over the other end 34B of the drawbar shaft 34 and slidably mounted on the inner central portion 60B of the threaded outer nut 60. Also, the adjustable nut assembly 38 includes means in the form of a snap ring 66 for retaining the non-threaded inner washer 64 in the open inner end 58A of the hollow outer sleeve 58. The compression elements 56 are preferably belleville washers disposed in the annular space 62 in the hollow outer sleeve 58 about the inner central portion 60B of the threaded outer nut 60 between the non-threaded inner washer 64 and the outer portion 60A of the threaded outer nut 60. The number, size, temper, and stacking relative one another, of these concave compression washers 56 can be preselected in order to tailor the the maximum amount of tension that can be imposed in the drawbar shaft 34. The compression washers 56 ensure that no more than the desired level of tensioning force is imposed on the drawbar shaft 34 by flexing from an uncompressed state shown in FIG. 4 to a compressed state shown in FIG. 5 once the preset level of force on the drawbar shaft 34 is reached during pivoting of the cam lever arm 46 from its disengaged position of FIG. 4 to its engaged position of FIG. 5.

To summarize, the improved features of the quick-release apparatus 10 of the present invention provide: (1) a position-locating protuberance 50 on the body 42 of the cam lever assembly 36 serving as a locator of only one position aligned with the adjacent fork tine tip 14 at which the cam lever body 42 must be disposed in order to mate the cam lever body 42 with the tine tip 14 and pivot the cam lever 44 to the proper engaged position, and to prevent the lever arm 46 from being used as a wrench to rotate the drawbar shaft 34; (2) an adjustable nut assembly 38 which can be easily adjusted to have the correct number of compression washers 56 for consistently imposing the desired level of tensioning force on the drawbar shaft 34 when the lever arm 46 is moved to its engaged position; and (3) a position-locating bifurcated structure 52 on the outer end 46A of the cam lever arm 46 serving as a locator of only one position aligned with the adjacent fork tine 14 at which the cam lever arm 46 must be disposed in order to pivot the cam lever arm 46 to the proper engaged position.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. In combination with an assembly which includes a hollow hub for mounting a bicycle wheel and a hollow axle extending through said hub and rotatably mounting said hub, said axle having opposite ends extending from opposite ends of said hub and fitted within slots in lower tips of a pair of fork tines of a bicycle frame, a quick-release apparatus, comprising:

(a) a drawbar shaft removably mounted through said hollow axle and having opposite ends extending from said opposite ends of said axle;

(b) a cam lever assembly mounted at one of said ends of said drawbar shaft, said cam lever assembly including a body slidably mounted for axial movement on said one end of said drawbar shaft and a cam lever movably mounted to said body and being manually movable between a disengaged position and an engaged position for producing axial movement of said body toward and away from said one axle end;

(c) an adjustable nut assembly threaded on the other of said ends of said drawbar shaft, said manual movement of said cam lever from said disengaged position to said engaged position producing axial movement of said body toward said adjustable nut assembly on said other end of said shaft and engagement of said body and adjustable nut assembly with the adjacent lower tips of the fork tines located on said opposite ends of said axle so as to impose a force on said drawbar shaft that places it under tension, causing said body and adjustable nut assembly to clamp the fork tine tips against said opposite ends of said axle and thereby secure the bicycle wheel to the frame; and (d) a locating element attached to said body of said cam lever assembly and being configured to interfit at only one position with the tine tip for enabling pivotal movement of said cam lever from said disengaged position to a proper engaged position while preventing rotation of said cam lever and said body therewith relative to said axle in order to rotate said drawbar shaft for threadably tightening said adjustable nut assembly on opposite end of said drawbar shaft.

2. The quick-release apparatus of claim 1 wherein said locating element is a proturberance fixed on and projecting from said body of said cam lever assembly and facing toward the lower tip of the adjacent one of the fork tines, said protuberance being aligned with and inserted within the slot in the tine tip.

3. The quick-release apparatus of claim 1 further comprising:

a position-locating member attached on said cam lever of said cam lever assembly and matable at only one position with the adjacent fork tine when said cam lever is moved from said disengaged to engaged position.

4. The quick-release apparatus of claim 3 wherein said position-locating member is a bifurcated structure fixed to and extending transversely from an outer end of said cam lever, said member having a generally U-shaped configuration for at least partially encompassing the adjacent fork tine when said cam lever is moved from said disengaged to said engaged position and said member is mated with the adjacent fork tine.

5. The quick-release apparatus of claim 1 wherein said adjustable nut assembly includes:
   a housing threaded onto said other end of said drawbar shaft; and
   a preselected number of resiliently flexible compression elements captured in said housing for presetting the amount of tension that can be imposed on said drawbar shaft when said cam lever is moved from said disengaged position to said engaged position.

6. The quick-release apparatus of claim 5 wherein said housing of said adjustable nut assembly includes:
   a hollow outer sleeve open an inner end facing toward an adjacent end of said axle; and
   a threaded outer nut having an outer portion fitted within and attached to the outer end of the hollow sleeve, said outer nut also having an inner central portion fixed to and projecting axially from said outer portion thereof and being internally threaded for threading onto an externally threaded portion of said other end of said drawbar shaft.

7. The quick-release apparatus of claim 6 wherein said inner central portion of said threaded outer nut is smaller in diameter than said outer portion thereof so as to provide an annular space within said outer sleeve about said inner portion of said threaded outer nut.

8. The quick-release apparatus of claim 7 wherein:
   said housing of said adjustable nut assembly further includes a non-threaded inner washer fitted over said other end of said drawbar shaft and slidably mounted on said inner central portion of said threaded outer nut, said housing also including means for retaining said non-threaded inner washer in said open inner end of said hollow outer sleeve; and
   said compression elements are washers disposed in said annular space in said hollow outer sleeve about said inner central portion of said threaded outer nut between said non-threaded inner washer and said outer portion of said threaded outer nut.

9. The quick-release apparatus of claim 8 wherein said retaining means is a slip ring being compressible for insertion and withdrawal to and from said hollow outer sleeve.

10. The quick-release apparatus of claim 5 further comprising:
    a position-locating member attached on said cam lever of said cam lever assembly and matable at only one position with the adjacent fork tine when said cam lever is moved from said disengaged to engaged position.

11. The quick-release apparatus of claim 10 wherein said position-locating member is a bifurcated structure fixed to and extending transversely from an outer end of said cam lever, said member having a generally U-shaped configuration for at least partially encompassing the adjacent fork tine when said cam lever is moved from said disengaged to said engaged position and member is mated with the adjacent fork tine.

12. In combination with an assembly which includes a hollow hub for mounting a bicycle wheel and a hollow axle extending through said hub and rotatably mounting said hub, said axle having opposite ends extending from opposite ends of said hub and fitted with slots in lower tips of a pair of fork tines of a bicycle frame, a quick-release apparatus, comprising:
   (a) a drawbar shaft removably mounted through said hollow axle and having opposite ends extending from said opposite ends of said axle;
   (b) a cam lever assembly mounted at one of said ends of said drawbar shaft, said cam lever assembly including a body slidably mounted for axial movement on said one end of said drawbar shaft and a cam lever movably mounted to said body and being manually movable between a disengaged position and an engaged position for producing axial movement of said body toward and away from said one axle end;
   (c) an adjustable nut assembly threaded on the other of said ends of said drawbar shaft, said manual movement of said cam lever from said disengaged position to said engaged position producing axial movement of said body toward said adjustable nut assembly on said other end of said shaft and engagement of said body and adjustable nut assembly with the adjacent lower tips of the fork tines located on said opposite ends of said axle so as to impose a force on said drawbar shaft that places it under tension, causing said body and adjustable nut assembly to clamp the fork tine tips against said opposite ends of said axle and thereby secure the bicycle wheel to the frame; and
   (d) a position-locating member attached to said cam lever of said cam lever assembly and matable at only one position with the adjacent fork tine when said cam lever is moved from said disengaged to engaged position.

13. The quick-release apparatus of claim 12 wherein said position-locating member is a bifurcated structure fixed to and extending transversely from an outer end of said cam lever, said member having a generally U-shaped configuration for at least partially encompassing the adjacent fork tine when said cam lever is moved from said disengaged to said engaged position and said member is mated with the adjacent for tine.

14. In combination with an assembly which includes a hollow hub for mounting a bicycle wheel and a hollow axle extending through said hub and rotatably mounting said hub, said axle having opposite ends extending from opposite ends of said hub and fitted with lower tips of a pair of fork tines of a bicycle frame, a quick-release apparatus, comprising:
   (a) a drawbar shaft removably mounted through said hollow axle and having opposite ends extending from said opposite ends of said axle;
   (b) a cam lever assembly mounted at one of said ends of said drawbar shaft, said cam lever assembly including a body slidably mounted for axial movement on said one end of said drawbar shaft and a cam lever movably mounted to said body and being manually movable between a disengaged position and an engaged position for producing axial movement of said body toward and away from said one axle end; and
   (c) an adjustable nut assembly threaded on the other of said ends of said drawbar shaft, said manual movement of said cam lever from said disengaged position to said engaged position producing axial movement of said body toward said adjustable nut assembly on said other end of said shaft and engagement of said body and adjustable nut assembly with the adjacent lower tips of the fork tines located on said opposite ends of said axle so as to impose a force on said drawbar shaft that places it under tension, causing said body and adjustable nut assembly to clamp the fork tine tips against said opposite ends of said axle and thereby secure the bicycle wheel to the frame;

(d) said adjustable nut assembly including a housing threaded onto said other end of said drawbar shaft, and a preselected number of resiliently flexible compression elements captured in said housing for presetting the amount of tension that can be imposed on said drawbar shaft when said cam lever is moved from said disengaged position to said engaged position;

(e) said housing of said adjustable nut assembly including
  (i) a hollow outer sleeve open an inner end facing toward an adjacent end of said axle, and
  (ii) a threaded outer nut having an outer portion fitted within and attached to the outer end of the hollow sleeve, said outer nut also having inner central portion fixed to and projecting axially from said outer portion thereof and being internally threaded for threading onto an externally threaded portion of said other end of said drawbar shaft.

15. The quick-release apparatus of claim 14 wherein said inner central portion of said threaded outer nut is smaller in diameter than said outer portion thereof so as to provide an annular space within said outer sleeve about said inner portion of said threaded outer nut.

16. The quick-release apparatus of claim 15 wherein:

said housing of said adjustable nut assembly further includes a non-threaded inner washer fitted over said other end of said drawbar shaft and slidably mounted on said inner central portion of said threaded outer nut, said housing also including means for retaining said non-threaded inner washer in said open inner end of said hollow outer sleeve; and said compression elements are washers disposed in said annular space in said hollow outer sleeve about said inner central portion of said threaded outer nut between said non-threaded inner washer and said outer portion of said threaded outer nut.

17. The quick-release apparatus of claim 16 wherein said retaining means is a slip ring being compressible for insertion and withdrawal to and from said hollow outer sleeve.

18. The quick-release apparatus of claim 14 further comprising:

a position-locating member attached on said cam lever of said cam lever assembly and matable at only one is moved from said disengaged to engaged position.

19. The quick-release apparatus of claim 18 wherein said position-locating member is a bifurcated structure fixed to and extending transversely from an outer end of said cam lever, said member having a generally U-shaped configuration for at least partially encompassing the adjacent fork tine when said cam lever is moved from said disengaged to said engaged position and said member is mated with the adjacent fork tine.

* * * * *